United States Patent
Sbrana

[19]

[11] Patent Number: 5,972,151
[45] Date of Patent: Oct. 26, 1999

[54] METHOD AND APPARATUS FOR APPLYING A COVER SHEET TO THE SURFACE OF A MOLD

[75] Inventor: Loredano Sbrana, Varese, Italy

[73] Assignee: Tecnos S.P.A., Nerviano, Italy

[21] Appl. No.: 08/953,343

[22] Filed: Oct. 17, 1997

[30] Foreign Application Priority Data

Oct. 22, 1996 [IT] Italy .................................. MI96A2190

[51] Int. Cl.⁶ .................................................... B29C 53/00
[52] U.S. Cl. .......................... 156/229; 156/242; 156/286; 156/382; 156/494; 264/101; 264/511; 264/553; 264/571; 425/405.1; 425/546
[58] Field of Search .................................. 156/229, 285, 156/286, 382, 494, 242; 264/101, 500, 511, 544, 553, 571; 425/405.1, 546

[56] References Cited

U.S. PATENT DOCUMENTS

| | | |
|---|---|---|
| 3,953,273 | 4/1976 | Faller ........................................ 156/224 |
| 3,954,537 | 5/1976 | Alfter et al. ................................ 156/82 |
| 3,962,392 | 6/1976 | Conner, Jr. ............................ 264/553 X |
| 4,116,736 | 9/1978 | Sanson et al. .............................. 156/79 |
| 4,267,142 | 5/1981 | Lankheet .................................. 264/510 |
| 4,439,392 | 3/1984 | Schutzler et al. ........................ 264/511 |
| 4,769,100 | 9/1988 | Short et al. .............................. 156/285 |
| 4,923,539 | 5/1990 | Spengler et al. .......................... 156/79 |

*Primary Examiner*—James Sells
*Attorney, Agent, or Firm*—Pillsbury Madison & Sutro Intellectual Property Group

[57] ABSTRACT

A method and an apparatus for applying a cover sheet of plastic material to the surface of a mold, during the molding of panels and/or of plastic pieces. The cover sheet is pneumatically held and stretched by a support frame provided with a sheet clamping groove, which peripherally extends for at least part or the edges of the mold; the support frame is provided with an air suction chamber connected to the sheet clamping groove by at least an air suction slot which opens on the bottom of the groove. The pneumatic support frame for the cover sheet and the mold are movable between each other for pneumatically adhering the cover sheet to the edges and the internal surface of the mold.

11 Claims, 7 Drawing Sheets

METHOD AND APPARATUS FOR APPLYING A COVER SHEET TO THE SURFACE OF A MOLD

BACKGROUND OF THE INVENTION

The present invention refers to a method for automatically applying a plastic sheet material on a surface inside the shaping cavity of a mold, during the molding process of panels and/or of plastic pieces which are thus partially or totally provided with an aesthetic or impermeable exterior cover, as well as it is directed to an apparatus for molding plastic pieces provided with a cover sheet of plastic material on at least one side surface.

PRIOR ART

In the production of pieces in plastic material, for example in the production of polyurethane foam panels or paddings to be used in soundproofing and thermal protection of environments, motor vehicles, or for any other application, as well as in the production of shaped articles, the application of a cover sheet of plastic material is often required during the molding phase. For example, in the molding of polyurethane foam pieces, a suitable proofing is required in order to prevent the foam from absorbing moisture or water, deteriorating with time and making its thermal and/or soundproofing features worse.

In order to overcome such inconveniences, or to prevent the polyurethane material molded pieces from deteriorating, an impermeable cover is usually provided by plastic sheets previously applied to the internal surface of the mold, during molding.

Moreover, molding techniques by injection or thermal compression of pieces in plastic material requiring the application of a cover sheet on at least one side of the molded piece, are well known.

Although the molding procedures by pouring, injection and/or thermal compression of pieces in plastic material can be carried out with totally automated apparatuses, presently the step of applying a cover sheet to the internal surface of the shaping cavity of a mold is difficult to automate and therefore manual operations are often required.

The conventional systems presently in use, starting from a rolled-up film, generally require the use of a double clamping frame comprising two superimposed frame members which are arranged over and below the plastic film from which the sheet material to be applied onto the mold is cut, or require the use of support frames comprising pins, clamping means, or co-operating with suitable chains.

These conventional systems have remarkable drawbacks as they do not allow for a complete automation and for a correct stretching and positioning of the sheets. In particular they involve a complex construction and provide a low efficiency, as mechanical holding at spaced apart points does not always assure a perfect stretching of the plastic sheet, or it does not assure a good sealing of the sheet against the mold edges during the vacuum forming of the same sheet against the shaping surface of the mold to be covered; in this way tearing and breaking often occur along the edges of the covering plastic sheet.

A conventional clamping or holding frame, besides the above mentioned inconveniences, is moreover quite difficult to use with several types of molding presses, or with molds having different shapes and dimensions.

U.S. Pat. No. 3,954,537, U.S. Pat. No. 4,116,736 and EP-A-0 281 724 relate to some examples of vacuum assisted molding with cover sheets.

OBJECTS OF THE INVENTION

An object of the present invention is therefore to provide a method for applying a cover sheet onto the surface inside the shaping cavity of a mold, in the production of panels and/or of plastic pieces provided with a covering, which overcomes the inconveniences of the traditional systems and which allows for a complete automation of the manufacturing, independently from the type of press in use and from the molding technology of the production plant.

A further object of the invention is to provide a method for applying a cover sheet, as referenced above, which makes use of a particular stretching frame for the sheet material, and which has no mechanical clamping means, assuring a continuous holding of the sheet for the entire peripheral edge or along a specific portion of the peripheral edges. Moreover damaging of sheet material is thus avoided while it is maintained in a stretched condition until there is a complete adhesion of the sheet against the surface of the mold.

A further object of the invention is to provide for an apparatus suitable for the method referenced above, which makes use of a pneumatic clamping frame, of special design allowing for a complete automation of the molding operations and for an easy accommodation to any type of press and molds. Therefore, the present invention is suitable for any requirement and for both cold and hot application of plastic films, depending on the molding technology.

The above is achievable by a method and apparatus for applying sheet material to the internal surface of the shaping cavity of a mold, for molding plastic pieces partially or totally provided with an exterior covering according. More specifically, according to a first aspect of the invention a method has been provided for applying covering sheets of plastic material to the internal surface of the shaping cavity of a mold, according to which at least one covering sheet is held in a stretched condition by a peripheral support frame to be adhered by vacuum against the edges and to the internal surface of the mold, characterized by:

providing the sheet support frame with pneumatically actuable clamping means comprising a clamping groove peripherally extending to the frame for air suction and clamping said cover sheet;

stretching the cover sheet pneumatically clamped on the frame, by continuously sucking air through said clamping groove;

moving the support frame with the cover sheet clamped in a stretched condition to tightly press the same cover sheet against the peripheral edges of the mold; and adhering by vacuum the cover sheet to the cavity surface of the mold, while continuously sucking air to keep the cover sheet clamped into said clamping groove.

According to a second aspect of the present invention, an apparatus has been devised for molding plastic pieces provided with a cover sheet of plastic material on at least one side surface thereof, comprising:

a mold having a shaping cavity and peripheral edges;

a support frame for peripherally clamping and stretching said cover sheet, said support frame comprising pneumatically actuable clamping means provided with a peripherally extending clamping groove for air sucking and clamping the cover sheet;

an air suction chamber in said support frame opening towards and longitudinally extending along said clamping groove;

and control means to move said support frame between an advanced position in which said support frame is clamping and stretching a cover sheet, and a retracted position in which said support frame tightly presses said cover sheet against the peripheral edges of the mold.

BRIEF DESCRIPTION OF THE DRAWINGS

These and further features and developments of the invention, will be more clear from the following description, with reference to the accompanying drawings, in which.

DETAILED DESCRIPTION OF THE INVENTION

With reference now to FIGS. 1 to 6 hereinbelow we will describe the general features of the method and apparatus according to the invention.

Figure 1:
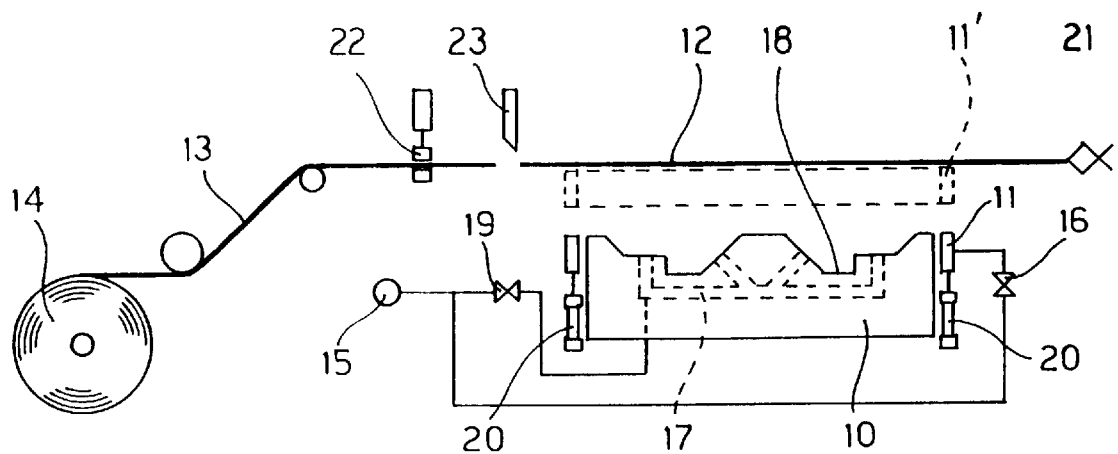
FIGS. 1 to 3 show the main steps of the method according to the invention.
Figure 2:
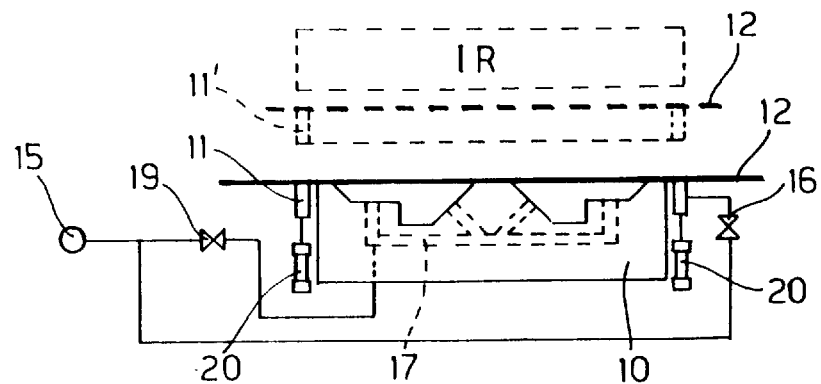
Figure 3:
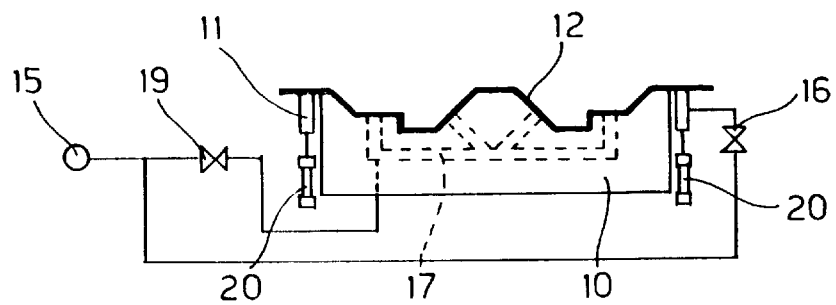

FIGS. 1 to 3 schematically show the sequence of the more significant steps of the method according to the invention, to apply a cover sheet of plastic material onto the internal surface of the shaping cavity of a mold member 10, by a support frame 11 peripherally extending around the mold 10 for pneumatically clamping and stretching a sheet 12 for example of plastic material, which is unrolled and cut from a bobbin 14 of a plastic film.

Figure 4:
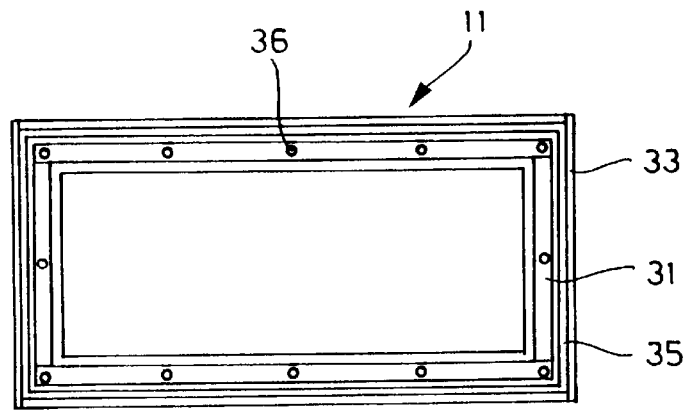
FIG. 4 shows a top view of the support frame for pneumatically holding a plastic sheet, according to the invention.
Figure 5:
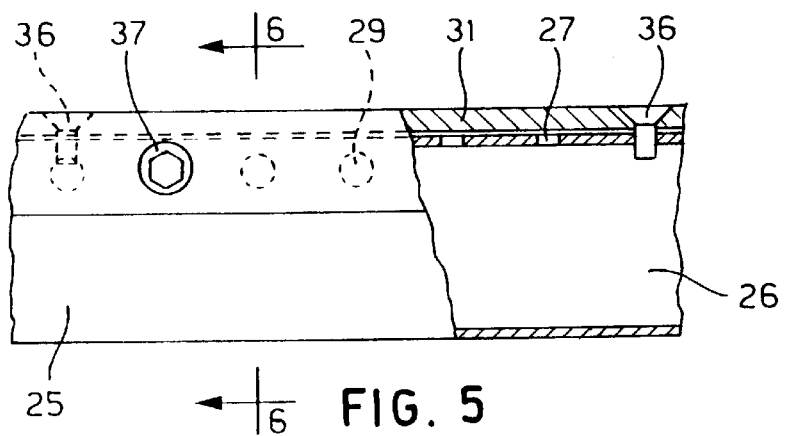
FIG. 5 is an enlarged side view of part of the front side of the support frame of FIG. 4.
Figure 6:
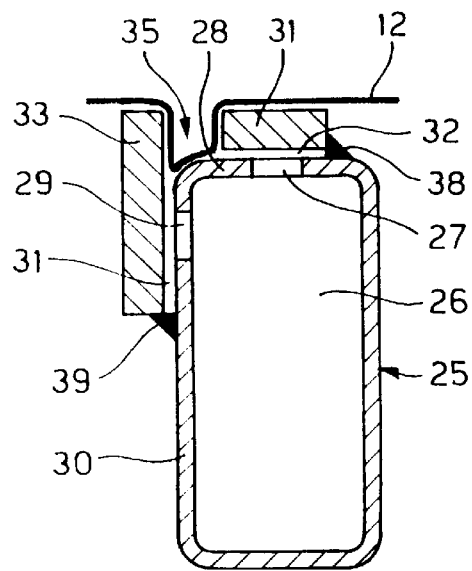
FIG. 6 is a further enlarged sectional view taken along line 6—6 of FIG. 5.

The frame 11 for holding or supporting the sheet 12, as hereinafter explained with reference to FIGS. 4 to 6, is constituted by a special annular frame comprising tubular members provided with an air suction front slot, which is selectively connectable to a vacuum source 15 or air suction device through a respective pneumatic circuit comprising a solenoid actuated control valve 16; correspondingly, the mold 10 comprises suction ducts 17 opening on the internal surface 18 of the shaping cavity of the same mold, which are selectively connectable to the vacuum source 15 through a respective pneumatic circuit comprising a solenoid actuated control valve 19.

The frame 11 is movably supported with respect to the mold 10, for example by pneumatic cylinders 20, to be moved between a retracted or lower position, where it surrounds the mold 10, and an advanced or upper position 11' where the frame 11 gets in contact with a plastic film 13 previously unrolled from the bobbin 14.

More precisely, the plastic film 13 is unrolled from the bobbin 14 drawing it by a suitable gripper device 21 to slide over the pneumatic holding or support frame 11; thereafter the film 13 is locked by a locking device 22, and then it is pneumatically clamped against the support frame 11 which in the meantime has been moved toward position 11' and connected to the vacuum source 15.

Successively, a plastic sheet 12 is cut by a knife 23, and then the frame 11 with the plastic sheet pneumatically held in a stretched condition, is lowered until the sheet 12 is tightly pressed against the edges of the mold 10 (FIG. 2); optionally heating of the plastic sheet 12 may be performed at a predetermined temperature by an infrared ray heating device IR, or by any other suitable heating means, depending on the nature of the plastic film used or on molding requirements.

At this point, by maintaining the air suction with the support frame 11 and therefore by maintaining the cover sheet 12 in a stretched condition, vacuum may be generated in the mold 10 by connecting the suction ducts to the vacuum source 15, until making the plastic sheet 12 completely adhere to the internal surface of the mold cavity; this condition is shown in the scheme of FIG. 3.

At this point, after providing, for example, for pouring a metered quantity of a polyurethane mixture, or for the injection of a plastic material, or for layering one or more sheets of thermoforming material, the mold member 10 is closed by a cover or moved on a similar mold member, which in turn may be pre-arranged with a cover sheet by the above described method. In the closed cavity of the mold a shaped piece will be formed having the outer surface, coated on one or both sides with a layer of plastic sheet material ready for a successive use.

In the example of FIGS. 1 to 3, the support frame 11 is supposed to be movable toward the film 13, independently from the mold 10; however several solutions are possible, providing for example the frame 11 and the cylinder system 20 to be an integral part of the same mold, which in turn may be fixed or movable with the same frame 11 toward the cover sheet 12.

The innovative features of the pneumatic support frame 11, the use of which is a substantial part of the method according to the invention, are hereinafter described in detail with reference to a preferred embodiment, illustrated in FIGS. 4 to 6 of the accompanying drawings.

As shown in said figures, the frame 11 has an annular form, for example quadrangular or closed on each side, formed by tubular sections 25 defining a suction chamber 26, annularly extending around the sides of the frame, and connectable to a vacuum source in the above mentioned mode.

The tubular member 25 preferably comprise a rectangular cross-section having the smaller side wall which extends parallel to the main plane of the mold; the tubular member 25 in turn is provided with a plurality of suction holes 27 on a smaller side wall 28 facing the plastic sheet 12, as well as a plurality of holes 29 on outer side wall 30 which is orthogonal to the smaller side wall 28, the holes 27 and 29 being in a back position with respect to the corner defined by the walls 28 and 30.

A bar 31 is longitudinally fixed to the smaller side wall 28 of the tubular member 25, overlapping the holes 27 in a position slightly spaced apart from the same wall 28 to form a narrow slot 32 where the suction holes 27 open.

Correspondingly, on the outer side wall 30, in correspondence to the holes 29 a second bar 33 is longitudinally fixed to the tubular member 25 and is similarly spaced apart to form a second slot 34 where the suction holes 29 open.

The bar 31 is provided in a back position with respect to the corner of the tubular member 25, while a bar 36 extends beyond the smaller side wall 28 to form together with the bar 31 a longitudinal groove 35 facing toward the plastic sheet 12 and in which slots 32 and 34 open.

This particular embodiment of the pneumatic frame 11, in the example of FIG. 6 and the particular arrangement on orthogonal planes of the suction slots 32 and 34, which open toward the bottom of the groove 35, have proved to be particularly advantageous as they tend to create by suction, stretching forces for the film 13 or the plastic sheet 12 in a rearwardly oriented direction of the slots 32 and 34 for stretching and continuously holding the plastic sheet 12, thus avoiding excessive stresses or tears on the same sheet 12; this is possible as the sheet 12 is pneumatically locked for the entire periphery of the frame 11, resting at the bottom of the groove 35. In the example of FIG. 6, two slots 32 and 34 are shown, which are arranged in orthogonal planes between each other; however other solutions or arrangements or the use of one or more suction slots are possible, depending on the requirements and features of the plastic sheet 12 to be pneumatically stretched and held.

In order to accurately control the thickness of the two suction slots 32 and 34, suitable spacers (not shown) are provided between the bars 31, 33 and corresponding side walls 28 and 30 of the tubular member 25; for example said spacers may be provided in correspondence to the fastening screws 36 and 37 screwing in corresponding threaded holes of the tubular member 25, while a weld bead 38, 39 provides for the necessary fastening on the side of the slots 32, 34 opposed to the groove 35.

So far the fundamental features of the method and apparatus according to the invention for applying plastic sheets to the surface of a mold, in the production of panels, polyurethane foam or plastic pieces with an impermeable protective cover have been described, as well as a preferred embodiment of the pneumatic support frame. The system has been described in the production of polyurethane foam pieces and in its general features, with reference to a generic mold where the pneumatic frame could be a separate or an integral part with the mold itself; however the same system may be applied to other molding processes, as initially referred.

Several specific solutions are also possible, which may be suitable for molds of different type and for the opening system of the molding press. For example in the previous figures, the frame 11 had an annular flat form, closed on each side; however, it is possible to differently make the support frame, for example with an open side, or with a three-dimensional shape, providing for suitable air sucking means for the cover sheet 12 on one front face of the same frame, for pneumatically holding the plastic sheet 12 along a continuous sucking line extending for the entire peripheral outline of the frame or for a part of the same. In this way it is possible to retain the cover sheet 12 in a stretched condition along all or few of its sides, in the desired positions, by an extremely simple, reliable and easily automated solution for any type of press. This is shown, as an example, in FIGS. 7 and 8 for the application of the plastic sheet 12 to the two mold members of a press opening at 90°.

Figure 7:
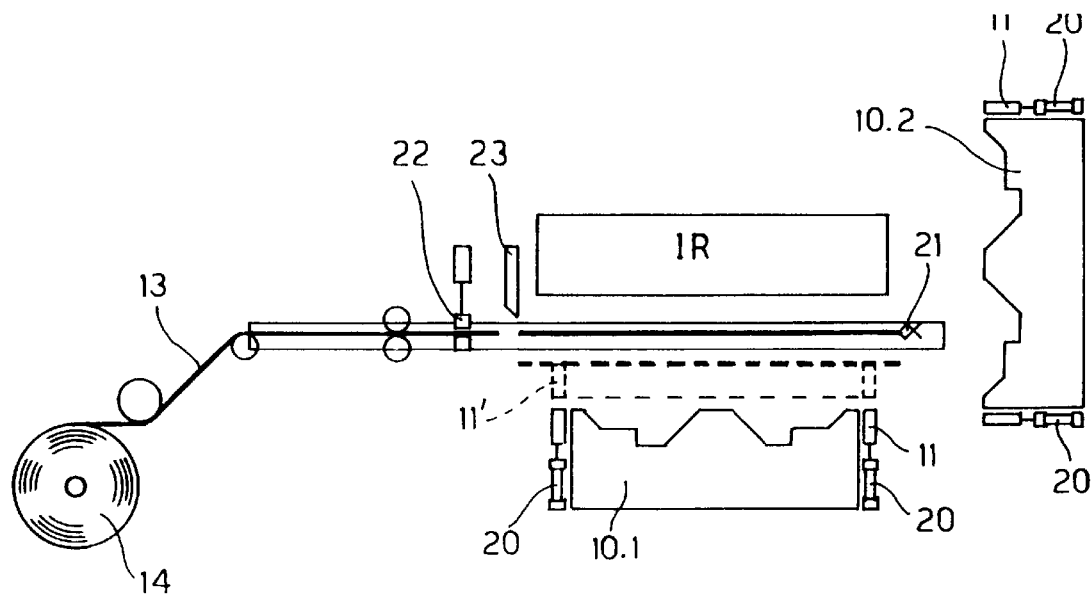
FIGS. 7 and 8 schematically show the use with the mold of a press opening at 90°.
Figure 8:
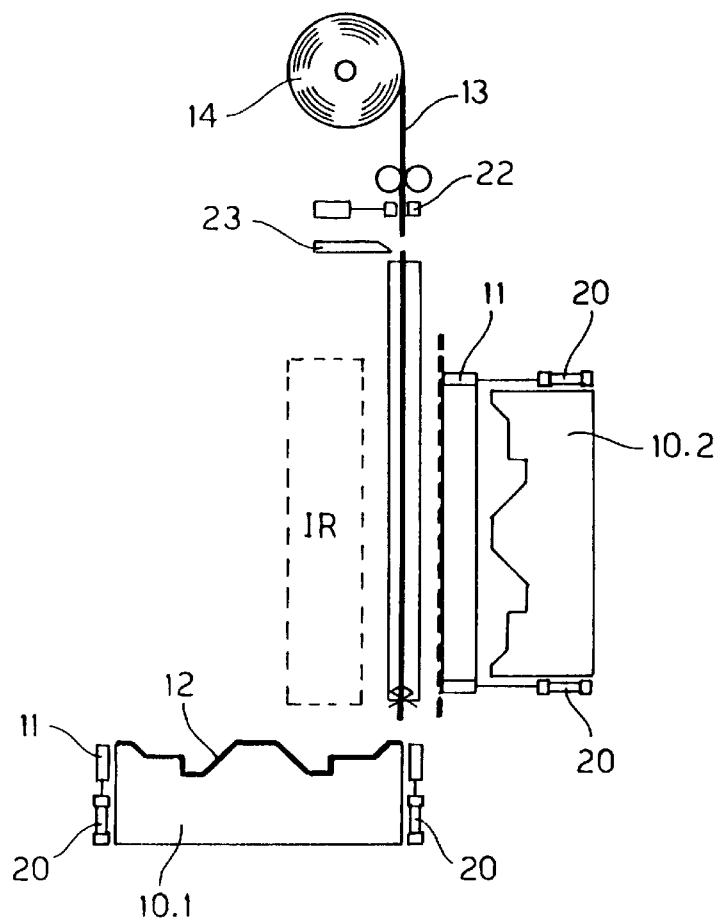

In FIGS. 7 and 8 the same reference numbers have been used for each similar or corresponding parts with respect to the previous figures.

FIG. 7 shows in particular the application of a plastic sheet 12 to the horizontal mold member 10.1, while FIG. 8 shows the application of the plastic sheet 12 to a vertical mold member 10.2.

The operating mode of the apparatus of FIGS. 7 and 8 is quite similar to the previous one, illustrated with reference to FIGS. 1 to 3; therefore the film 13 of plastic material will be unrolled from the bobbin 14, laid down in front of the mold, possibly heated at the desired temperature by an infrared ray heater IR, pneumatically taken by the support frame 11, cut and transferred in a stretched condition against the edges of the horizontal mold 10.1, or respectively of the vertical mold 10.2, where it will be made adhere to the internal surface at the mold by simple suction, as previously described.

Figure 9:
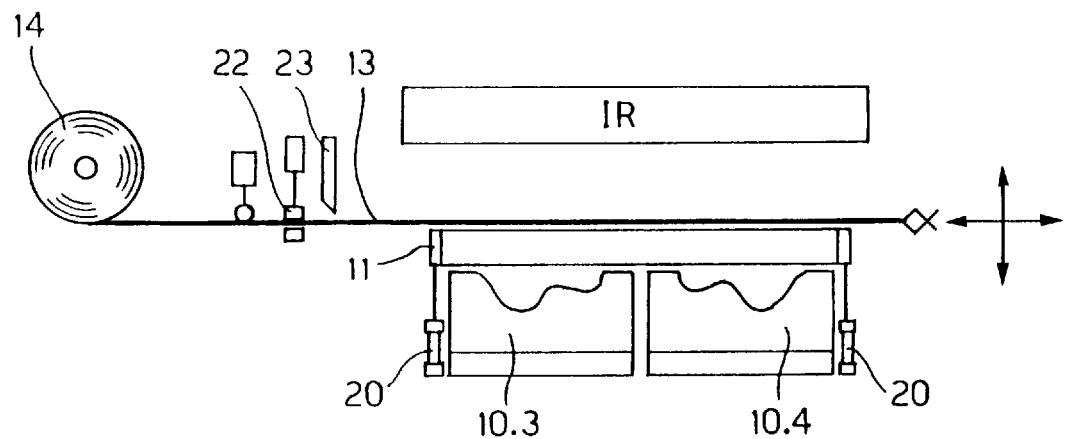
FIGS. 9, 10 and 11 schematically show a further embodiment for the application of a plastic sheet conjointly to two mold members of a press opening at 180°, by a common pneumatic support frame.
Figure 10:
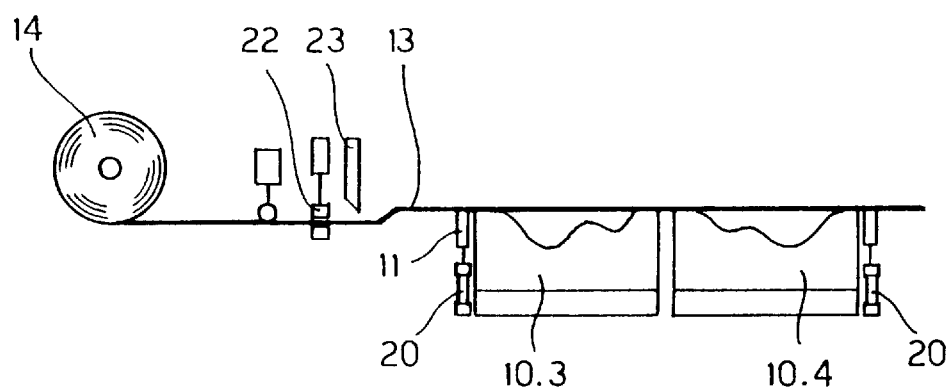
Figure 11:
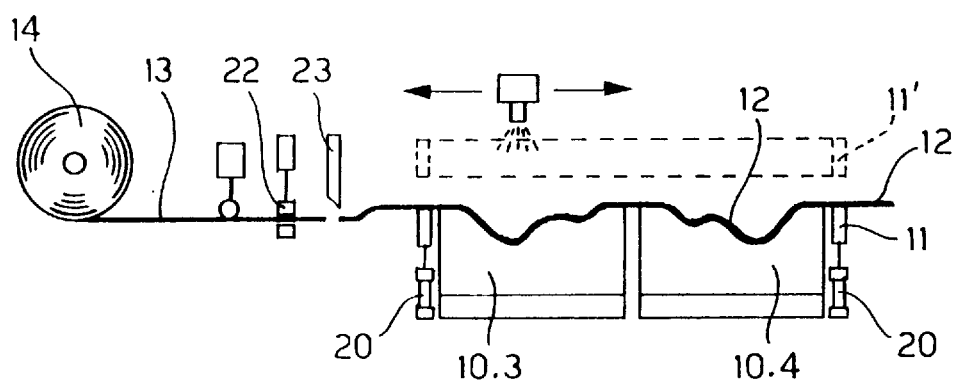
Figure 12:
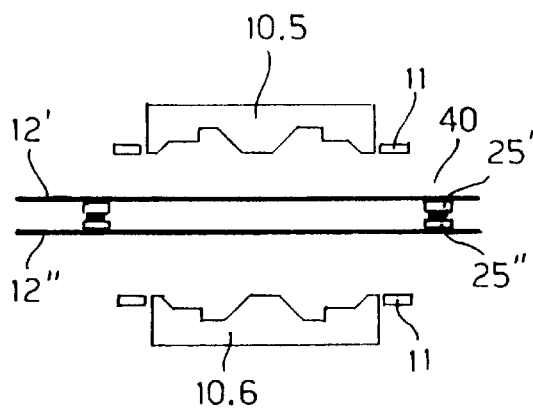
FIGS. 12 to 17 schematically show the method according to the invention for a press having a mold opening at parallel planes.

FIGS. 9 to 11 show a further embodiment of the apparatus which makes use of a common pneumatic frame for both the mold members 10.3 and 10.4 in a press opening at 180°; for all the rest, the operating mode of the apparatus is the same as the previously illustrated one, with the only difference being that now the frame 11 is to be removed or supported by a suitable system to move for example in the directions of the two arrows indicated in FIG. 9, in such a way that the frame 11 can be moved between a holding position for the plastic sheet 12, or a position for applying the sheet to the mold, and back or spaced apart position in which allows for filling in the mold cavity with a metered quantity of polyurethane mixture before closing the same mold; of course each process phase may occur in the same position on a fixed press, or in different positions of a general plant of revolving type.

Therefore in FIGS. 9, 10 and 11 the same reference numbers have been used for similar or corresponding parts with respect to the previous examples.

FIGS. 12 to 17 show a further embodiment particularly suitable for presses opening parallel to the closing plane of the molds, in which the use of an auxiliary double pneumatic frame is suggested to move the plastic sheets 12' and 12" to the support frames 11 for the upper mold member 10.5 and respectively for the lower mold member 10.6.

Figure 13:
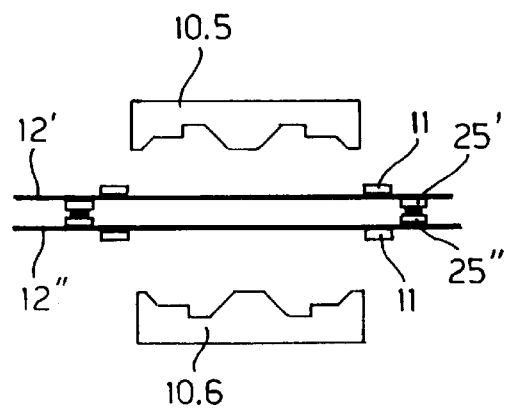

As shown in the figures, the apparatus comprises an auxiliary double frame 40, in an intermediate position between the support frames 11 in the open condition of the mold; the auxiliary frame 40 comprises two tubular frame members 25' and 25", of the type described in FIG. 6, which are side by side arranged and connected each other; the auxiliary frame 40 is greater than the pneumatic frames 11 of the mold, as schematically shown in FIG. 13 to allow the removal during foaming steps.

The double pneumatic frame 40 is arranged in an intermediate position between the two plastic sheets 12' and 12" which have been unrolled by suitable bobbins, not shown, and is suitable for pneumatically holding the same for the time necessary to allow the transfer of the same sheets to the two support frames 11 of the two mold members, which in the meantime were approached for pneumatically clamping the sheets 12' and 12" retained on the auxiliary frame 45.

Figure 14:
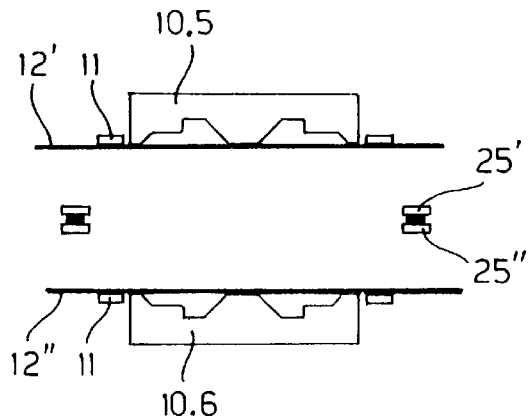
Figure 15:
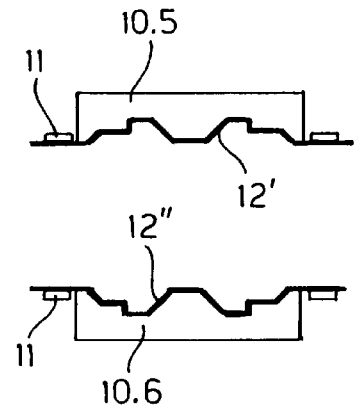
Figure 16:
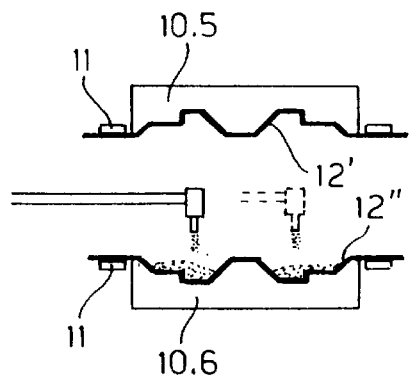
Figure 17:
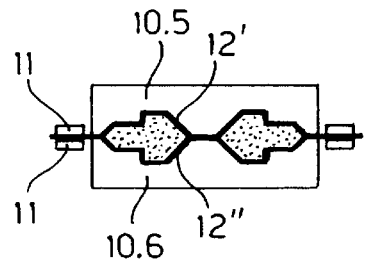

When the sheets 12' and 12" have been released by the auxiliary frame 40, the same sheets are transferred by the frames 11 against the mold members 10.5 and 10.6, FIG. 14, and are made adhere to the internal surface of the mold, FIG. 15, as previously described. Successively, a metered quantity of a polyurethane mixture is fed, in the lower mold member 10.6 as shown in FIG. 16, and the mold is then closed to allow the polyurethane mixture to foam in the cavity of the mold and polymerize.

The use of a double pneumatic frame 40 having the same functional features of the pneumatic frames 11 for the single mold members is advantageous as it allows the adaptation of the apparatus to this type of press.

Figure 18:
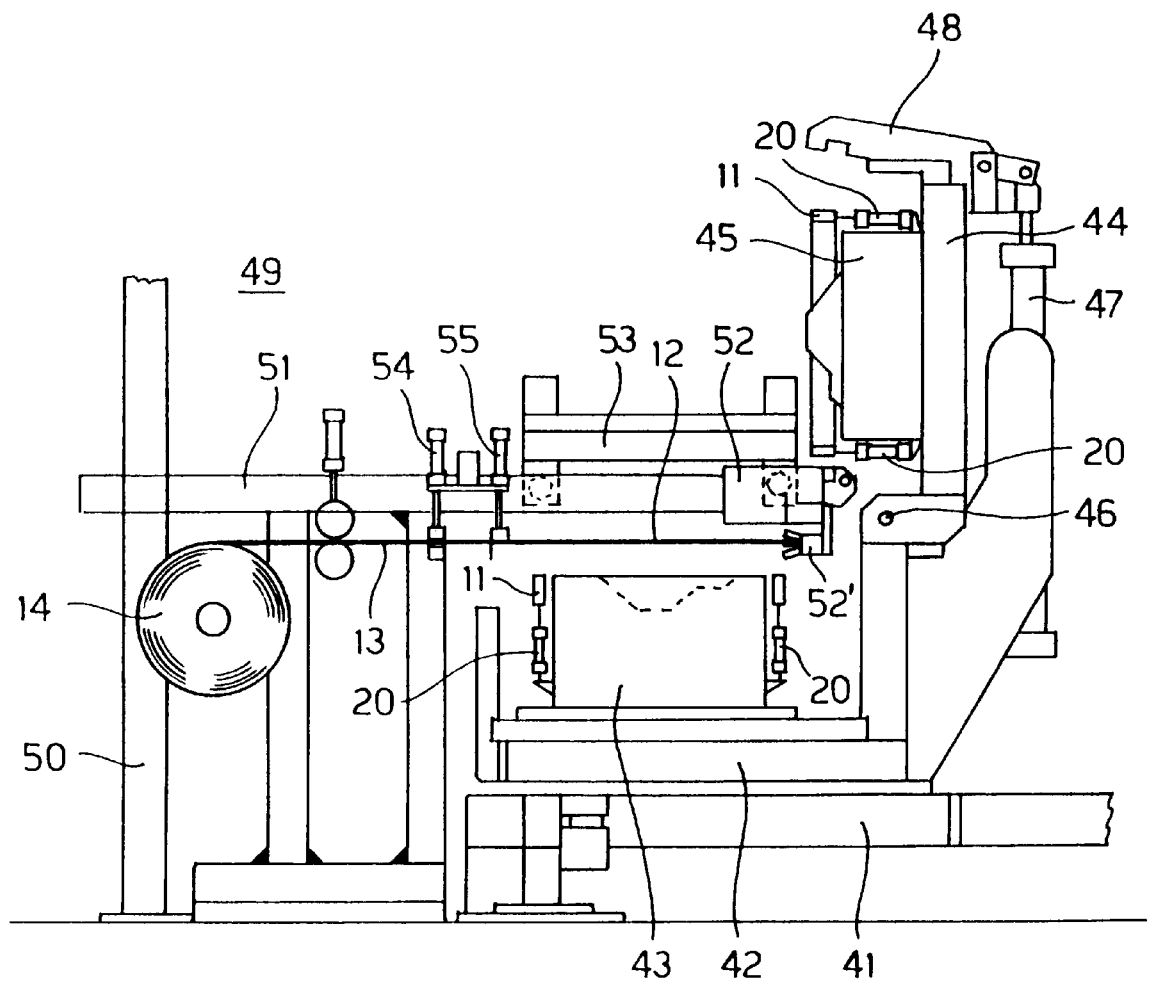
FIG. 18 shows a practical embodiment of the apparatus for applying a plastic sheet to the horizontal mold member of a press opening at 90°.
Figure 19:
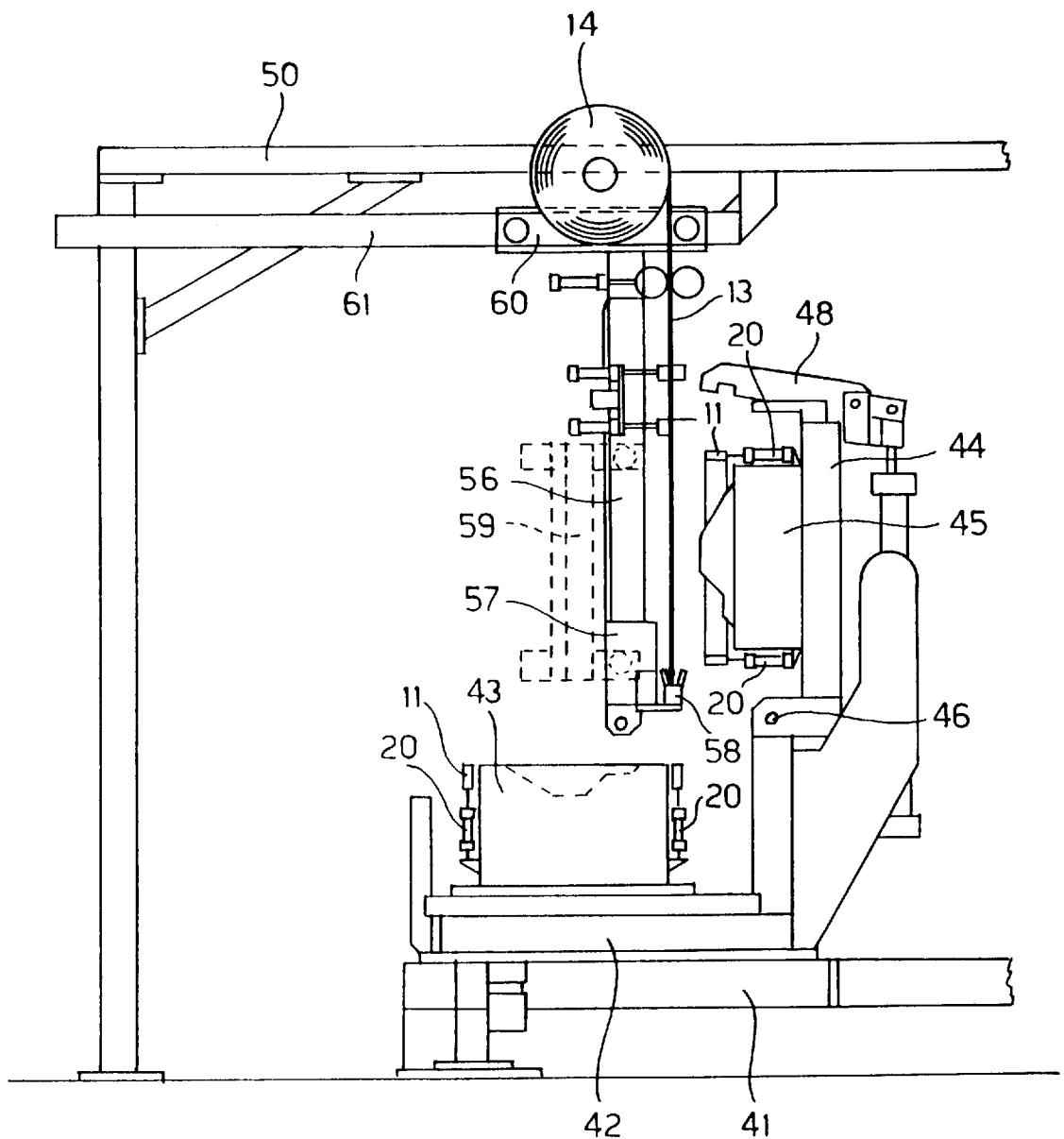
FIG. 19 shows a practical embodiment of the apparatus for applying a plastic sheet to the vertical mold member of a press opening at 90°.

FIGS. 18 and 19 show a practical embodiment of a press opening at 90° embodying the apparatus for applying cover sheets of plastic material, according to the examples of the previous FIGS. 7 and 8.

In the shown case, the press constitutes a part of a general plant of revolving type, which has been partially shown to illustrate the station for applying the plastic sheets.

In particular, in FIG. 18 the press is shown in an open condition in a station for applying the cover sheet to the horizontal mold member, while in FIG. 19 it has been shown in correspondence of a station for applying the cover sheet to the vertical mold member.

The press is supported by a revolving table 41 to be moved along a circular path provided with several working stations. The press comprises a lower plane 42 for supporting the mold member 43, and an upper plane 44 for supporting the mold member 45; the upper plane 44 is hinged at 46 to the lower plane 42. Reference number 47 in FIG. 19 indicates a pneumatic cylinder which drives the rotating movement of the mobile plane 44, as well as operates a latching device 48 for the mold.

Reference number 49 in FIG. 18 lastly indicates the station for applying a plastic sheet 12 to the lower mold member 43. The station 49 always comprises a structure 50 provided with a horizontal guide 51 along which a trolley 52 runs; the trolley 52 is provided with grippers 52' for holding and unrolling the plastic film 13 from the bobbin 14. The trolley 52 is moved along the guide 51 by any drive device, for example by a pneumatic cylinder or a chain drive device, not shown, while reference number 53 in the same figure indicates a infrared ray heating device, movable along the horizontal guides 51. Reference number 54 moreover indicates a locking device for the film 13 while 55 indicates a cutting device for cutting the sheet 12; lastly, reference number 11 indicates again the pneumatic support frame for the cover sheet 12, connected to the cylinders 20 according to the previous examples.

FIG. 19 of the accompanying drawings, on the contrary, shows an apparatus for applying a plastic sheet to the vertical mold member of the open press; in this case the entire unit for unrolling the plastic film, comprising the support for the bobbin 14 and the vertical guide 56 for the trolley 57 of the grippers 58, respectively for sliding the infrared ray heating device 59, is in turn supported by a carriage 60 which is movable along a horizontal guide 61 fixed to the structure 50 of the whole plant.

From what is described and shown in the accompanying drawings it is therefore evident that a completely automated method and apparatus have been provided for applying cover sheets to the internal surface of molds, in the production of panels and/or articles in plastic material, comprising the use of a special frame provided with pneumatically actuated gripping means for gripping and stretching a cover sheet, provided with an air sucking slot peripherally extending to the mold; in this way an apparatus has been provided having a high degree of reliability and adaptability to any type of press.

The proposed solution overcomes the inconveniences of the conventional holding systems; in particular it allows for holding and perfectly stretching the plastic sheet on each side, or some of them, both with planar support frames of closed or open type, and with frames having any required three-dimensional shape.

However, it is to be intended that what above said and shown above with reference to the accompanying drawings has been given only as an example of the general features of the claimed invention.

What we claim is:

1. A method for applying plastic material to an internal surface of a mold cavity having peripheral edges, said method comprising:

positioning a plastic sheet over a stretcher frame having a pneumatically actuable clamping groove that extends peripherally thereabout;

connecting said clamping groove to an air suction device and clamping the plastic sheet to the frame by continuously applying air suction to the clamping groove, thereby stretching the plastic sheet;

moving the frame with the plastic sheet clamped in a stretched condition to place the plastic sheet in sealing contact against the peripheral edges of the mold;

connecting the cavity of the mold to the air suction device; and conforming the plastic sheet to the shape of the molding cavity by continuously applying air suction to the cavity of the mold.

2. The method according to claim 1, wherein said stretching is in all directions toward the periphery of the stretcher frame.

3. An apparatus for applying a plastic sheet to a cavity of a mold having peripheral edges, said apparatus comprising:

a sheet-clamping frame having a peripherally extending clamping groove formed thereon;

a vacuum chamber operatively connected to said clamping groove;

at least one vacuum duct opening into said mold cavity;

a connection device selectively interconnecting said vacuum chamber and said at least one vacuum duct to an air suction device; and a frame controller to actuate relative movement between said frame and said mold between an advanced position, wherein said frame is positioned away from said mold and on which a plastic sheet is clamped and stretched, and a retracted position in which said frame is adjacent said mold to position the plastic sheet sealingly against said peripheral edges of said mold.

4. The apparatus according to claim 3, wherein said vacuum chamber comprises:

a plurality of suction holes spaced apart along the vacuum chamber; and a bar member longitudinally extending along said wall, wherein said bar member is slightly spaced apart from the wall to form a suction slot, wherein said suction slot is connected to the vacuum chamber by said plurality of suction holes.

5. The apparatus according to claim 4, comprising a first and a second suction slot, wherein said first and second suction slots are provided on orthogonally arranged walls of said vacuum chamber, and open into the bottom of the clamping groove.

6. The apparatus according to claim 3, wherein said sheet-clamping frame moves independently of the mold.

7. The apparatus according to claim 3, wherein said sheet-clamping frame and the frame controller are operatively supported by the mold.

8. The apparatus according to claim 3, in particular for a molding press having mold support platens opening at 90°, wherein separate pneumatic sheet-clamping frames are provided on each of said support platens.

9. The apparatus according to claim 3, in particular for a molding press having mold support platens opening at 180°, wherein a single sheet-clamping frame is provided for both support platens.

10. The apparatus according to claim 3, in particular for a mold having upper and lower mold members opening on parallel planes wherein each mold member is provided with a respective sheet-clamping main frame, and wherein an auxiliary double frame comprising opposite outer faces and pneumatically actuable sheet-clamping means on opposite outer faces is provided to clamp separate plastic sheets between said main frames in an open condition of the mold.

11. The apparatus according to claim 3, wherein said suction slot opens at the bottom of said clamping groove.

* * * * *